United States Patent [19]

Coenen et al.

[11] Patent Number: 4,560,513
[45] Date of Patent: Dec. 24, 1985

[54] PROCESS FOR THE RECOVERY OF LECITHIN

[75] Inventors: Hubert Coenen, Essen; Rudolf Eggers, Buxtehude; Rainer Hagen, Essen, all of Fed. Rep. of Germany

[73] Assignee: Fried. Krupp Gesellschaft mit beschränkter Haftung, Essen, Fed. Rep. of Germany

[21] Appl. No.: 516,346

[22] Filed: Jul. 22, 1983

[30] Foreign Application Priority Data

Aug. 4, 1982 [DE] Fed. Rep. of Germany ....... 3229041

[51] Int. Cl.$^4$ .............................................. C07F 9/10
[52] U.S. Cl. .................................... 260/403
[58] Field of Search ........................................ 260/403

[56] References Cited

U.S. PATENT DOCUMENTS 3,969,196 7/1976 Zosel ..................................... 203/49
4,367,178 1/1983 Heigel et al. ......................... 260/403

FOREIGN PATENT DOCUMENTS 1493190 1/1973 Fed. Rep. of Germany .
3011185 10/1981 Fed. Rep. of Germany .

*Primary Examiner*—Anton H. Sutto
*Attorney, Agent, or Firm*—Spencer & Frank

[57] ABSTRACT

A process for the recovery of lecithin from mucilaginous substances obtained in the production of vegetable fats and oils by extraction with a solvent which is gaseous under normal conditions. The mucilaginous substances are extracted at a pressure from $2 \times p_k$ to 500 bar and at a temperature from 0° C. to $<T_k$ for a period from 15 to 60 minutes to form a charged compressed solvent phase containing extracted substances and an extraction residue containing insoluble lecithin. Then, the charged, compressed solvent phase is separated from the insoluble lecithin. Thereafter the extracted substances are separated from the charged, compressed solvent phase and the gaseous solvent is returned to the extraction stage. The lecithin is removed from the extraction stage and is obtained in solid form by evaporating the solvent.

8 Claims, 1 Drawing Figure

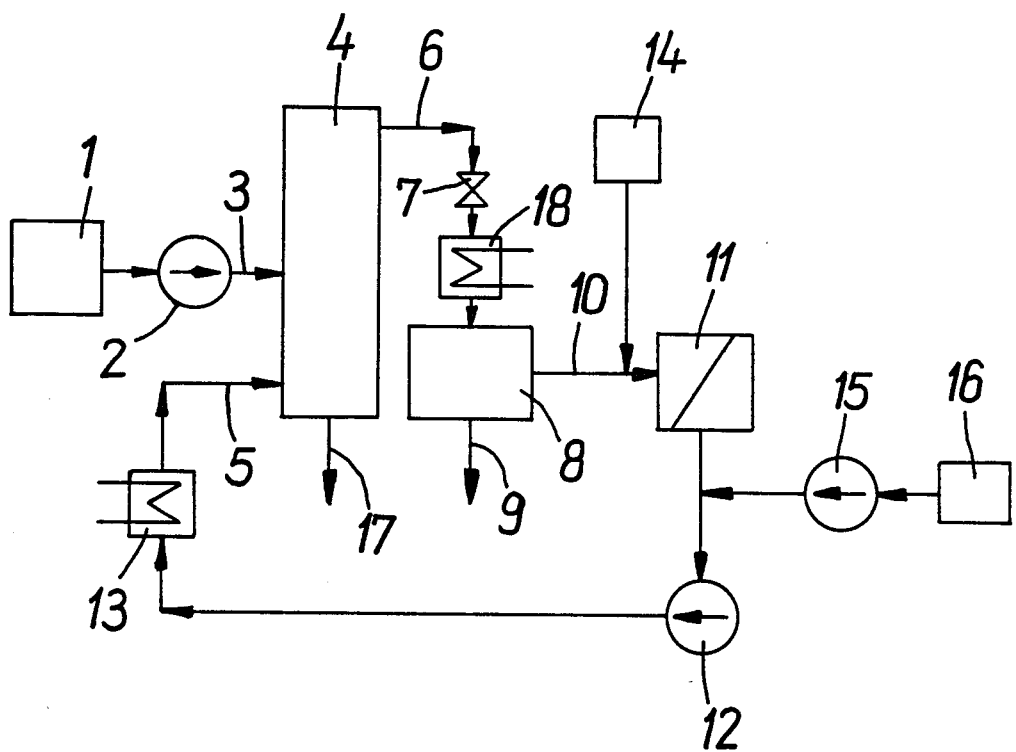

PROCESS FOR THE RECOVERY OF LECITHIN

BACKGROUND OF THE INVENTION

The present invention relates to a method for recovering lecithin from mucilaginous substances obtained in the production of vegetable fats and oils by extraction of the mucilaginous substances with a solvent which is gaseous under normal conditions (0° C. 1 bar).

Lecithin is a mixture of various phosphatides belonging, in particular, to the group of lecithins and cephalins. Phosphatides are fat-like triglycerides which are soluble in hydrocarbons and insoluble in acetone, in which the phosphoric acid replaces a fatty acid radical and is esterified with the OH group of choline, colamine, serine, inositol or another serine-like base. Since the phosphatides contain lipophilic and hydrophilic as well as acid and basic groups in one molecule, lecithin is used particularly as an emulsifier. Additionally, lecithin is used as a feed additive as well as for the manufacture of cosmetic and pharmaceutical preparations.

Phosphatides are natural substances which occur together with animal and vegetable fats, e.g., in egg yolks and in soy beans. Raw vegetable oils and fats obtained by melting, pressing and/or extraction of fruits and seeds, in particular, contain more or less phosphatides which are obtained as mucilaginous substances by treating the raw vegetable oils and fats, after they have been freed from solids, with water, water vapor and/or diluted acids. These mucilaginous substances are centrifuged out and contain, in addition to the phosphatides, accompanying substances which are oils or fats, fatty acids, bittering and dyestuffs. In a purification process, the mucilaginous substances, also called raw lecithin, are processed into lecithin which can then be used for the production, processing and conservation of food as well as pharmaceutical and cosmetic preparations.

U.S. Pat. No. 4,367,178 discloses a process for recovering lecithin from raw lecithin in which the raw lecithin is treated in an extraction stage with a gas which is in the supercritical state with respect to its pressure and its temperature to form an extract containing supercritical gas phase and an extraction residue comprised of purified lecithin. The extract-containing supercritical gas phase is then conducted from the extraction stage to a separator stage where a separation into gas and extract is effected by way of changes in pressure and/or temperature. The gas is returned to the extraction stage. The purified lecithin which remains as a residue in the extraction stage is removed from the extraction stage either continuously or discontinuously. In this process, gaseous halogenated hydrocarbons, as well as the gases $CO_2$, $SF_6$, $N_2O$, $SO_2$, $C_2H_6$, $C_2H_4$, $C_3H_8$ and/or $C_3H_6$ are used as extraction agents. If $CO_2$ is used as the extraction agent, the extraction stage operates at a pressure of 72 to 800 bar and at a temperature of 31.3° to 100° C., and the separation stage operates at a pressure of 10 to 72 bar and at a temperature of 10° to 32° C. The extract separated from the supercritical gas phase includes the accompanying substances contained in the raw lecithin, particularly fats and oils, respectively, and water. The process disclosed in U.S. Pat. No. 4,367,178 has the drawback that the extraction time, which is preferably 3 to 7 hours, is rather long, which is caused by the poor solubility in the supercritical gas phase of the substances accompanying the raw lecithin.

SUMMARY OF THE INVENTION

It is an object of the present invention to provide a process for the recovery of lecithin which, compared to the prior art process, results in an improved purification performance (shorter extraction time) and furnishes a physiologically unobjectionable and high quality end product.

Another object of the present invention is to provide a process which is able to process mucilaginous substances of different origins into lecithin.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for the recovery of lecithin from mucilaginous substances obtained in the production of vegetable fats and oils by extraction of the mucilaginous substances with a solvent which is gaseous under normal conditions, comprising: extracting the mucilaginous substances in an extraction stage with a gaseous solvent at a pressure of $2 \times p_k$ to 500 bar and at a temperature of 0° C. to $<T_k$ ($p_k$=critical pressure, $T_k$=critical temperature of the gaseous solvent) for a period of 15 to 60 minutes to form a charged compressed solvent phase containing extracted substances and an extraction residue containing insoluble lecithin; thereafter separating the charged, compressed solvent phase from the insoluble lecithin; then separating the extracted substances from the charged, compressed solvent phase by reduction of pressure or reduction of pressure and increase of temperature; returning the gaseous solvent to the extraction stage; and removing the lecithin from the extraction stage and obtaining it in solid form by evaporating the solvent.

The condition of operating at a lower pressure limit of $2 \times p_k$ and at an upper temperature limit of $<T_k$ indicates that the extraction is to take place at least at double the critical pressure and closely below the critical temperature (e.g. at $T_k - 2°$ C.).

Preferably, carbon dioxide, ethane and/or ethene or a mixture of one or a plurality of these gases with methane, propane and/or propene is used as the gaseous solvent. The gaseous solvent can contain an entrainer, preferably ethanol.

In one preferred embodiment of the present invention, the mucilaginous substances are extracted with ethane at 250 to 350 bar and at 15° to 31° C. and the separation of the extracted substances from the charged, compressed solvent phase takes place at 30 to 40 bar and at 20° C.

In another preferred embodiment of the present invention, the mucilaginous substances are extracted with carbon dioxide at 300 to 500 bar and at 5° to 30° C. and the separation of the extracted substances from the charged, compressed solvent phase takes place at 10 to 30 bar and at 5° to 30° C.

It is to be understood that both the foregoing general description and the following detailed description are exemplary and explanatory, but are not restrictive of the invention.

BRIEF DESCRIPTION OF THE DRAWINGS

The sole FIGURE of the drawings is a schematic representation of an apparatus for performing the process of the present invention.

DETAILED DESCRIPTION OF THE INVENTION

The present invention can be used to process mucilaginous substances obtained in the recovery of all vegetable fats and oils. Lecithin produced according to the process of the present invention is of high quality and need not be bleached since extraction with a solvent that is gaseous under normal conditions takes place at gentle temperatures and in the absence of oxygen.

Since according to U.S. Pat. No. 4,367,178 supercritical gases are used to obtain lecithin and according to U.S. Pat. No. 3,969,169 many organic compounds are particularly well soluble in supercritical gases, it was extremely surprising that a solvent that is gaseous under normal conditions and whose pressure is supercritical while its temperature is subcritical better solves the accompanying substances in raw lecithin than a supercritical gas, while not taking up the phosphatides. Moreover, it could not be expected that the accompanying substances of the phosphatides would go into solution quickly and with high selectivity at a pressure of $2 \times p_k$ to 500 bar. Thus, the process according to the present invention has a high separating effect and a good purification output. It is further of advantage that the process according to the present invention can be operated discontinuously as well as continuously.

Preferably in the practice of the present invention, carbon dioxide, ethane and/or ethene or a mixture of one or a plurality of these gases with methane, propane and/or propene is used as the gaseous solvent. These solvents can be separated quantitatively without difficulty from the extract, which comprises the accompanying substances of the raw lecithin, as well as from the extraction residue which comprises the lecithin, at room temperature and under normal pressure and it is possible to recover the gases substantially without losses. The gaseous solvents are chemically inert with respect to the lecithin and leave no physiologically objectionable residues in the lecithin. It is surprising that the phosphatides (lecithin) are not soluble in the compressed gaseous solvents since these compounds have a fat-like character and are dissolved in hydrocarbons (hexane, benzene) under normal pressure.

The table below lists the critical data for the gaseous solvents used to recover lecithin.

| Gas | $P_k$ (bar) | $T_k$ (°C.) |
| --- | --- | --- |
| $CO_2$ | 73.9 | 31.0 |
| $CH_4$ | 48.0 | −81.5 |
| $C_2H_6$ | 48.9 | 32.1 |
| $C_2H_4$ | 51.2 | 10.0 |
| $C_3H_8$ | 42.6 | 96.7 |
| $C_3H_6$ | 46.0 | 92.0 |

The gas $CH_4$ is only used in mixtures with other gases. At this the mixtures must have a critical temperature above 0° C.

According to the present invention, in some cases the separating effect can be augmented by having the gaseous solvent contain an entrainer, preferably ethanol. Ethanol is particularly suitable as entrainer because it does not leave physiologically objectionable residues in the lecithin and need not be quantitatively separated from the lecithin. Although methanol, propanol, acetone, methyl ethyl ketone, methyl acetate, ethyl acetate, ethyl formiate and butanol are suitable as entrainers, it is better not to use these compounds in the recovery of lecithin so as to avoid potential dangers resulting from the use of liquid organic solvents. The concentration range of the entrainer in the gaseous solvent preferably is between 1% and 30% by weight, based on the weight of the gaseous solvent.

The process according to the present invention can be implemented with particular success if the mucilaginous substances are extracted with ethane at 250 to 350 bar and at 15° to 31° C. and if the separation of the extracted substances from the charged, compressed solvent phase takes place at 30 to 40 bar and at 20° to 40° C.

Moreover, the process according to the invention can be practiced with particular success if the mucilaginous substances are extracted with carbon dioxide at 300 to 500 bar and at 5° to 30° C. and if the separation of the extracted substances from the charged, compressed solvent phase takes place at 10 to 30 bar and at 5° to 30° C.

The lecithin obtained by employing either ethane or carbon dioxide as the gaseous solvent in the two ways just described contains acetone insoluble substances to at least 90%. The content of acetone insoluble substances is a measure for the lecithin content of the end product.

Turning now to the drawing, the present invention will now be explained in greater detail with the aid of the drawing.

From a reservoir tank 1, the mucilaginous substances are pumped by a pump 2 through a conduit 3 into an autoclave 4 which serves as the extraction stage. A compressed solvent passes through a conduit 5 into autoclave 4 where it is conducted in countercurrent to the mucilaginous substances and takes up water, fatty acids, bittering as well as fats and oils.

The charged, compressed solvent phase has a lower density than the lecithin phase and leaves autoclave 4 through a conduit 6. It is expanded (that is, it has its pressure reduced) by a valve 7 into a separator 8 which is preceded by a heat exchanger 18. Due to the reduction in pressure or the simultaneous reduction in pressure and increase in temperature, the extracted substances are separated from the solvent phase and are obtained from separator 8 through a conduit 9. The expanded solvent, freed from extract, leaves separator 8 through conduit 10 and enters a condenser 11 where it is liquefied. The liquefied solvent is brought to extraction pressure by a compressor 12 and to extraction temperature by a heat exchanger 13. Solvent losses are compensated by adding solvent to the extraction cycle from a reservoir 14 into conduit 10. By means of a pump 15, the entrainer can be added to the liquefied solvent in measured doses from a tank 16.

The lecithin remains in autoclave 4 and is obtained either in the form of a powder or as a solid block. The lecithin can be removed from autoclave 4 discontinuously or continuously. In the discontinuous mode, autoclave 4 is first expanded that is, the pressure in autoclave 4 is reduced) so that the remainder of gaseous solvent is separated from the lecithin which is thereafter removed mechanically from autoclave 4. In the continuous mode, the lecithin is discharged constantly through conduit 17 and is thereafter freed from the solvent. The lecithin forms a flowable suspension only if during the extraction it is obtained as a powder. A slight residual amount of ethanol also makes the lecithin somewhat more flowable. According to the process of the present invention, the oil content of the lecithin can be set precisely which contributes to the assurance of quality in the end product.

The solubility of soy bean oil in $CO_2$ was determined for three conditions of $CO_2$. Thus, the solubility was determined for $CO_2$ (a) in the form of a liquid at subcritical conditions, (b) in the form of a gas at supercritical conditions of above supercritical pressure and above supercritical temperature, and (c) in the form of a gas at conditions according to the present invention where the pressure is at least 2 $p_k$ and the temperature is below supercritical temperature. The values are reported below and indicate that by employing the conditions according to the present invention at a pressure far above the critical pressure and at a subcritical temperature, $CO_2$ has an unexpectedly high solubility for soy bean oil compared to the liquid and the supercritical state.

Solubility of soy bean oil in $CO_2$ at:
(a) 25° C., 70 bar=0.1 g oil/kg $CO_2$ (liquid, subcritical)
(b) 41° C., 350 bar=1.3 g oil/kg $CO_2$ (supercritical)
(c) 25° C., 300 bar=6.2 g oil/kg $CO_2$ (conditions according to the present invention)

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE 700 g mucilaginous substances obtained from soy bean oil were extracted for 45 minutes with 8.9 kg/h ethane in autoclave 4 at 280 bar and 20° C. The mucilaginous substances contained approximately 37% soy bean oil and free fatty acids, 62% acetone-insoluble substances and 1% water. The charged, compressed solvent phase was separated into its components at 36 bar and 30° C. in separator 8. The extracted oil was removed continuously from separator 8 and contained small quantities of water and fatty acids as well as 2% acetone insoluble substances. Pure lecithin having a softening point of 54° C., a yellowish white color and containing 92.7% acetone-insoluble substances was removed from autoclave 4.

It will be understood that the above description of the present invention is susceptible to various modifications, changes and adaptations, and the same are intended to be comprehended within the meaning and range of equivalents of the appended claims.

What is claimed is:

1. Process for the recovery of lecithin from mucilaginous substances obtained in the production of vegetable fats and oils by extraction of the mucilaginous substances with a solvent which is gaseous under normal conditions, comprising:

extracting the mucilaginous substances in an extraction stage with a solvent at a pressure of from twice the critical pressure to 500 bar and at a temperature greater than or equal to 0° C. but less than the critical temperature for a period of from 15 to 60 minutes to form a charged, compressed solvent phase containing extracted substances and an extraction residue containing insoluble lecithin;

thereafter separating the charged, compressed solvent phase from the insoluble lecithin;

then separating the extracted substances from the charged, compressed solvent phase by the reduction of pressure or the reduction of pressure and increase of temperature;

returning the gaseous solvent to the extraction stage; and removing the lecithin from the extraction stage and obtaining it in solid form by evaporating any solvent therefrom.

2. Process as defined in claim 1, wherein the solvent is at least one compound selected from the group consisting of carbon dioxide, ethane, ethene and a mixture of one or a plurality of these compounds with at least one compound selected from the group consisting of methane, propane, and propene.

3. Process as defined in claim 1, wherein the solvent contains an entrainer.

4. Process as defined in claim 3, wherein the entrainer is ethanol.

5. Process as defined in claim 1, wherein the mucilaginous substances are extracted with ethane at a pressure of from 250 to 350 bar and at a temperature of from 1° to 15° C. and the separation of the extracted substances from the charged, compressed solvent phase takes place at a pressure of from 30 to 40 bar and at a temperature of from 20° to 40° C.

6. Process as defined in claim 1, wherein the mucilaginous substances are extracted with carbon dioxide at a pressure of from 300 to 500 bar and at a temperature of from 5° to 29° C. and the separation of the extracted substances from the charged, compressed solvent phase takes place at a pressure of from 10 to 30 bar and at a temperature of from 5° to 30° C.

7. Process as defined in claim 2, wherein the solvent contains an entrainer.

8. Process as defined in claim 7, wherein the entrainer is ethanol.

* * * * *